United States Patent
Kim

(10) Patent No.: US 9,002,294 B2
(45) Date of Patent: *Apr. 7, 2015

(54) METHOD AND SYSTEM FOR EXPLICIT FEEDBACK WITH SOUNDING PACKET FOR WIRELESS LOCAL AREA NETWORKS (WLAN)

(71) Applicant: Broadcom Corporation, Irvine, CA (US)

(72) Inventor: Joonsuk Kim, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/132,181

(22) Filed: Dec. 18, 2013

(65) Prior Publication Data

US 2014/0105159 A1 Apr. 17, 2014

Related U.S. Application Data

(63) Continuation of application No. 11/535,794, filed on Sep. 27, 2006, now Pat. No. 8,706,048.

(60) Provisional application No. 60/830,928, filed on Jul. 14, 2006.

(51) Int. Cl.
| | |
|---|---|
| *H04B 1/00* | (2006.01) |
| *H04L 5/00* | (2006.01) |
| *H04B 7/04* | (2006.01) |
| *H04B 7/06* | (2006.01) |
| *H04L 25/03* | (2006.01) |
| *H04W 74/00* | (2009.01) |
| *H04L 25/02* | (2006.01) |

(52) U.S. Cl.
CPC ............ *H04L 5/0048* (2013.01); *H04B 7/0417* (2013.01); *H04B 7/0617* (2013.01); *H04B 7/0634* (2013.01); *H04B 7/0643* (2013.01); *H04L 25/0204* (2013.01); *H04L 25/0228* (2013.01); *H04L 25/03343* (2013.01); *H04L 2025/03426* (2013.01); *H04L 2025/03802* (2013.01); *H04W 74/00* (2013.01)

(58) Field of Classification Search
CPC ..................................................... H04B 7/0617
USPC ........................................................... 455/69
See application file for complete search history.

(56) References Cited

U.S. PATENT DOCUMENTS

| | | | |
|---|---|---|---|
| 2011/0164557 A1* | 7/2011 | Ariyavisitakul et al. | ..... 370/328 |
| 2011/0243207 A1* | 10/2011 | Tang et al. | ..... 375/224 |

* cited by examiner

*Primary Examiner* — David Bilodeau
(74) *Attorney, Agent, or Firm* — Garlick & Markison; Bruce E. Garlick

(57) ABSTRACT

Aspects of a method and system for explicit feedback with a sounding packet for wireless local area networks (WLAN). Aspects of the system may include a beamforming block that may enable generation of a plurality of RF chain signals based on a current steering matrix, where the current steering matrix may be a non-identity matrix. A processor may enable transmission of a request for feedback information via the plurality of RF chain signals. The request may contain medium access control (MAC) layer protocol data unit (PDU) data and channel sounding information, which may be encapsulated in a physical (PHY) layer PDU.

20 Claims, 11 Drawing Sheets

METHOD AND SYSTEM FOR EXPLICIT FEEDBACK WITH SOUNDING PACKET FOR WIRELESS LOCAL AREA NETWORKS (WLAN)

CROSS-REFERENCE TO RELATED APPLICATIONS/INCORPORATION BY REFERENCE

The present U.S. Utility patent application claims priority pursuant to 35 U.S.C. §120, as a continuation of U.S. Utility application Ser. No. 11/535,794, entitled "Method and System for Explicit Feedback with Sounding Packet for Wireless Local Area Networks (WLAN)," filed Sep. 27, 2006, pending, which claims priority pursuant to 35 U.S.C. §119(e) to U.S. Provisional Application Ser. No. 60/830,928, entitled "Method and System for Explicit Feedback with Sounding Packet for WLAN," filed Jul. 14, 2006, both of which are incorporated herein by reference for all purposes.

This application makes reference to:
U.S. patent application Ser. No. 11/450,818 filed on Jun. 9, 2006;
U.S. patent application Ser. No. 11/327,752 filed on Jan. 6, 2006;
U.S. patent application Ser. No. 11/393,224 filed on Mar. 30, 2006; and
U.S. application Ser. No. 11/110,241 filed Apr. 20, 2005.

Each of the above stated applications is hereby incorporated herein by reference in its entirety.

FIELD OF THE INVENTION

Certain embodiments of the invention relate to wireless communication. More specifically, certain embodiments of the invention relate to a method and system for quantization for explicit feedback with a sounding packet for WLAN.

BACKGROUND OF THE INVENTION

Multiple input multiple output (MIMO) systems are wireless communications systems that may transmit signals utilizing a plurality of transmitting antennas, and/or receive signals utilizing a plurality of receiving antennas. Communications between MIMO systems may be based on specifications from the Institute of Electrical and Electronics Engineers (IEEE). A MIMO system that receives a signal Y may compute a channel estimate matrix, H, based on the received signal. The signal may comprise information generated from a plurality of information sources. Each such information source may be referred to as a spatial stream. A transmitting MIMO system may utilize a plurality of transmitting antennas when transmitting a corresponding signal X. A receiving MIMO system may utilize a plurality of receiving antennas when receiving the signal Y. The channel estimate matrix for a downlink RF channel, $H_{down}$, may describe a characteristic of the wireless transmission medium in the transmission path from a transmitter, to a receiver. The channel estimate for an uplink RF channel, $R_{up}$, may describe a characteristic of the wireless transmission medium in the transmission path from the receiver to the transmitter.

According to the principle of reciprocity, a characteristic of the wireless transmission medium in the transmission path from the transmitter to the receiver may be assumed to be identical to a corresponding characteristic of the wireless transmission medium in the transmission path from the receiver to the transmitter. However, the channel estimate matrix $H_{down}$ may not be equal to a corresponding channel estimate matrix for an uplink RF channel $R_{up}$. For example, a noise level, for example an ambient noise level, in the vicinity of the transmitter may differ from a noise level in the vicinity of the receiver. Similarly, an interference level, for example electro-magnetic interference due to other electro-magnetic devices, in the vicinity of the transmitter may differ from an interference level in the vicinity of the receiver. At a transmitter, or receiver, there may also be electrical cross-coupling, for example leakage currents, between circuitry associated with a receiving antenna, or a transmitting antenna, and circuitry associated with another receiving antenna, or another transmitting antenna.

The principle of reciprocity, wherein it may be assumed that $H_{up}=H_{down}$, may also be based on the assumption that specific antennas at a transmitter or receiver are assigned for use as transmitting antennas, and/or assigned for use as receiving antennas. At the transmitter, a number of receiving antennas, $N_{RX}$, utilized at the receiver may be assumed. At the receiver, a number of transmitting antennas, $N_{TX}$, utilized at the transmitter may be assumed. If the assignments of at least a portion of the antennas at the transmitter are changed, the corresponding channel estimate matrix $H'_{up}$ may not be equal $H_{down}$. Similarly, if the assignments of at least a portion of the antennas at the receiver are changed, the corresponding channel estimate matrix $H'_{down}$ may not be equal $R_{up}$. Consequently, after reassignment of antennas at the transmitter and/or receiver, the principle of reciprocity may not be utilized to characterize communications between the transmitter and the receiver when $H_{up}$ does not equal $H'_{down}$, when $H'_{up}$ does not equal $H_{down}$, or when $H'_{up}$ does not equal $H'_{down}$.

The principle of reciprocity may enable a receiving wireless local area network (WLAN) device A to receive a signal Y from a transmitting WLAN device B, and to estimate a channel estimate matrix $H_{down}$ for the transmission path from the transmitting WLAN device B to the receiving WLAN device A. Based on the channel estimate matrix $H_{down}$, the WLAN device A may transmit a subsequent signal X, via an uplink RF channel, to the WLAN device B based on the assumption that the channel estimate matrix $H_{up}$ for the transmission path from the transmitting WLAN device A to the receiving WLAN device B may be characterized by the relationship $H_{up}=H_{down}$. When the WLAN devices A and B are MIMO systems, corresponding beamforming matrices may be configured and utilized for transmitting and/or receiving signals at each WLAN device.

Beamforming is a method for signal processing that may allow a transmitting MIMO system to combine a plurality of spatial streams in a transmitted signal X. Beamforming may comprise computing a matrix of beamforming coefficients. The beamforming coefficients may be utilized to compute a plurality of weighted sums representing a corresponding combination of signal strength levels from at least a portion of the plurality of spatial streams. Each weighted sum may be referred to as a radio frequency (RF) chain. A transmitting WLAN device may simultaneously transmit an RF chain from each of the plurality of transmitting antennas. The transmitted signal X may comprise the plurality of transmitted RF chains. Beamforming is also a method for signal processing that may allow a receiving MMO system to separate individual spatial streams in a received signal Y.

As a result of a failure of an assumed condition for the principle of reciprocity, a beamforming matrix at the transmitting WLAN device, and/or an equalization matrix at the receiving WLAN device, may be configured incorrectly. In a transmitted signal X, from the perspective of a signal associated with an $i^{th}$ spatial stream, a signal associated with a $j^{th}$ spatial stream may represent interference or noise. Incorrect configuration of one or more beamforming matrices may reduce the ability of the receiving WLAN device to cancel interference between an $i^{th}$ spatial stream and a $j^{th}$ spatial stream. Consequently, the received signal Y may be characterized by reduced signal to noise ratios (SNR). There may also be an elevated packet error rate (PER) when the receiving WLAN device decodes information contained in the received signal Y. This may, in turn, result in a reduced information transfer rate, as measured in bits/second, for communications between the transmitting WLAN device and the receiving WLAN device.

In some MIMO systems, a transmitting WLAN device may transmit a plurality of spatial streams based on channel state information at the transmitter (CSIT). The CSIT may be based on feedback information sent from the receiving WLAN device B to the transmitting WLAN device A. Based on the CSIT, the transmitting WLAN device A may compute estimated values for the channel estimate matrix $H_{down}$.

Channel sounding is one method by which a transmitting WLAN device may receive CSIT from a receiving WLAN device. When performing a channel sounding procedure, the transmitting WLAN device may transmit one or more sounding frames to the receiving WLAN device. In some MIMO systems, the sounding frames may be transmitted without beamforming by a plurality of RF chains. In this respect, the matrix utilized for generating a plurality of RF chains from a plurality of spatial streams may comprise an identity matrix.

Upon receipt of a sounding frame, the receiving WLAN device may begin to compute channel state information (CSI). The CSI may be represented by the channel estimate matrix H. The CSI may be sent to the transmitting WLAN device as feedback information. The receiving WLAN device may not utilize beamforming when transmitting signals for sending the CSI to the transmitting WLAN device. The transmitting WLAN device may utilize the received feedback information to generate a beamforming matrix. The transmitting WLAN device may utilize the beamforming matrix to transmit one or more subsequent frames comprising data in a subsequent transmitted signal X. After receiving the subsequent frames, the receiving WLAN device may send an acknowledgement frame to the transmitting WLAN device. The receiving WLAN device may not utilize beamforming when transmitting signals for sending the acknowledgement frame to the transmitting WLAN device.

In some MIMO systems, the channel sounding procedure comprises time one or more time durations during which a plurality of RF chains may be transmitted without utilizing beamforming. During these periods, a transmitting WLAN device may not be able to transmit data from one or more spatial streams in a transmitted signal X, such that the receiving WLAN device would be able to generate estimates for each of the spatial streams in a received signal Y. In this regard, the amount of time required to perform the channel sounding procedure may result in a reduction in the information transfer rate between the transmitting WLAN device and the receiving WLAN device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for explicit feedback with a sounding packet for WLAN, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention relate to a method and system for explicit feedback with a sounding packet for WLAN. In one exemplary embodiment of the invention, beamforming may be utilized by a transmitting WLAN device for transmitting a sounding frame that comprises data from a plurality of spatial streams. Thus, the transmitting WLAN device may initiate a channel sounding procedure while continuing to transmit data, via beamformed RF chains, utilizing a current steering matrix that is not an identity matrix. In this regard, the sounding frame may be "piggybacked" on a data frame transmitted via one or more beamformed RF chains. Based on feedback information received from the receiving WLAN device, the transmitting WLAN device may generate a subsequent steering matrix. The subsequent steering matrix may be utilized for transmitting subsequent data via a subsequent plurality of RF chains. In this exemplary embodiment of the invention, the amount of time required to perform a channel sounding procedure may be reduced, in comparison to conventional channel sounding procedure methods.

In another exemplary embodiment of the invention, a channel sounding procedure may be initialized by transmitting a sounding frame via a plurality of RF chains while utilizing a steering matrix that is not an identity matrix. Based on feedback information received from the receiving WLAN device, the transmitting WLAN device may generate a subsequent steering matrix. The subsequent steering matrix may be utilized for transmitting a subsequent frame comprising data via a subsequent plurality of RF chains. After receipt of the subsequent frame the receiving WLAN device may send an acknowledgement frame to the transmitting WLAN device.

Figure 1:
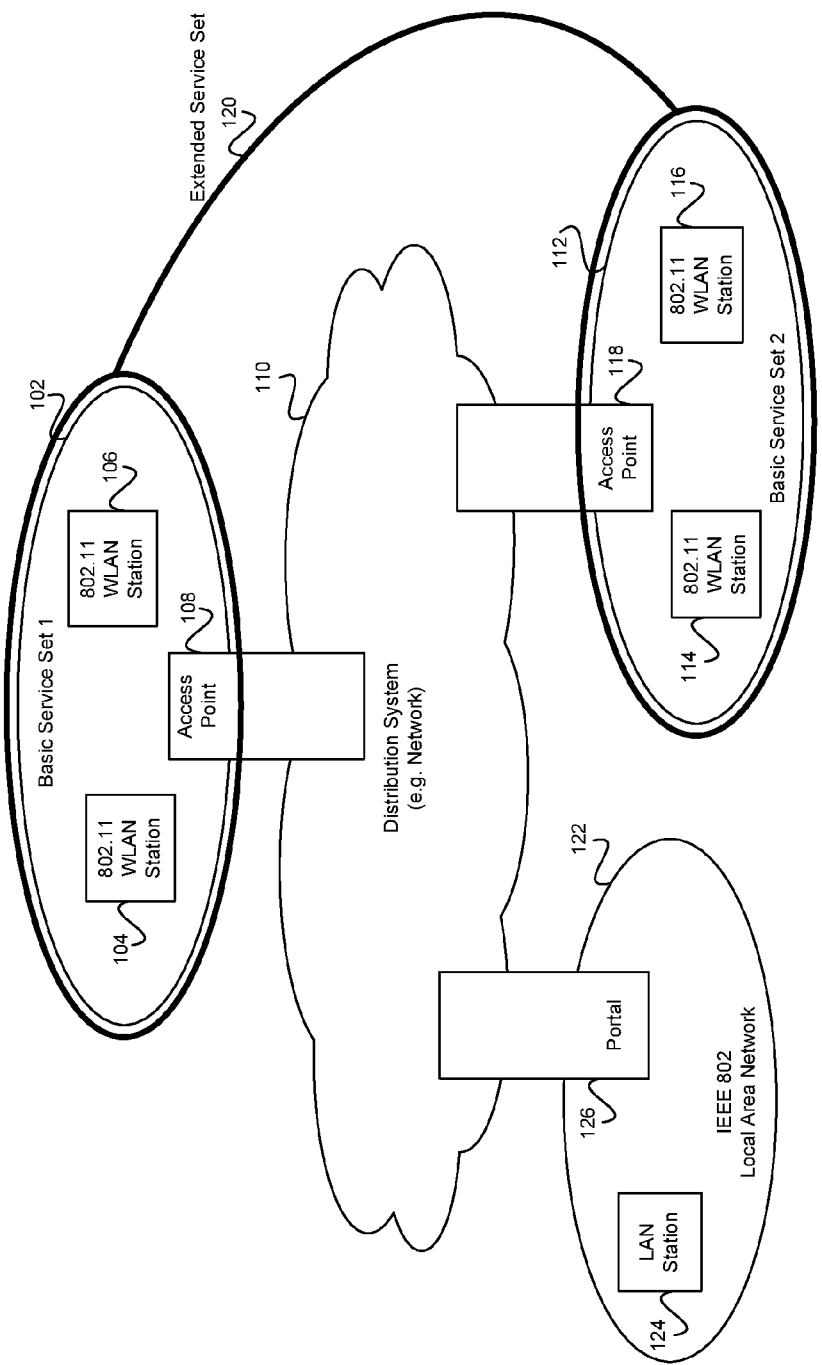
FIG. 1 is a block diagram of an exemplary system for wireless data communications, which may be utilized in connection with an embodiment of the invention.

FIG. 1 is a block diagram of an exemplary system for wireless data communications, which may be utilized in connection with an embodiment of the invention. With reference to FIG. 1, there is shown a distribution system (DS) 110, an extended service set (ESS) 120, and an IEEE 802 LAN or WAN 122. The ESS 120 may comprise a first basic service set (BSS) 102, and a second BSS 112. The first BSS 102 may comprise a first 802.11 WLAN station 104, a second 802.11 WLAN station 106, and an access point (AP) 108. The second BSS 112 may comprise a first 802.11 WLAN station 114, a second 802.11 WLAN station 116, and an access point (AP) 118. The IEEE 802 LAN 122 or WAN may comprise a LAN or WAN station 124, and a portal 126. An IEEE 802.11 WLAN station, or IEEE 802.11 WLAN device, is a WLAN system that may be compliant with at least a portion of the IEEE 802.11 standard.

A WLAN is a communications networking environment that comprises a plurality of WLAN devices that may communicate wirelessly via one or more uplink and/or downlink RF channels. The BSS 102 or 112 may be part of an IEEE 802.11 WLAN that comprises at least 2 IEEE 802.11 WLAN stations, for example, the first 802.11 WLAN station 104, the second 802.11 WLAN station 106, and the AP 108, which may be members of the BSS 102. Non-AP stations within BSS 102, the first 802.11 WLAN station 104, and the second 802.11 WLAN station 106, may individually form an association with the AP 108. An AP, such as AP 108, may be implemented as an Ethernet switch, bridge, or other device in a WLAN, for example. Similarly, non-AP stations within BSS 112, the first 802.11 WLAN station 114, and the second 802.11 WLAN station 116, may individually form an association with the AP 118. Once an association has been formed between a first 802.11 WLAN station 104 and an AP 108, the AP 108 may communicate reachability information about the first 802.11 WLAN station 104 to other APs associated with the ESS 120, such as AP 118, and portals such as the portal 126. The WLAN station 104 may subsequently communicate information wirelessly via the BSS 102. In turn, the AP 118 may communicate reachability information about the first 802.11 WLAN station 104 to stations in BSS 112. The portal 126, which may be implemented as, for example, an Ethernet switch or other device in a LAN, may communicate reachability information about the first 802.11 WLAN station 104 to stations in LAN or WAN 122 such as the 802 LAN or WAN station 124. The communication of reachability information about the first 802.11 WLAN station 104 may enable WLAN stations that are not in BSS 102, but are associated with ESS 120, to communicate wirelessly with the first 802.11 WLAN station 104 through ESS 120.

The DS 110 may provide an infrastructure which enables a first 802.11 WLAN station 104 in one BSS 102, to communicate wirelessly with a first 802.11 WLAN station 114 in another BSS 112. The DS 110 may also enable a first 802.11 WLAN station 104 in one BSS 102 to communicate with an 802 LAN or WAN station 124 in an IEEE 802 LAN or WAN 122, implemented as, for example a wired LAN or WAN. The AP 108, AP 118, or portal 126 may provide a means by which a station in a BSS 102, BSS 112, or LAN or WAN 122 may communicate information via the DS 110. The first 802.11 WLAN station 104 in BSS 102 may communicate information wirelessly to a first 802.11 WLAN station 114 in BSS 112 by transmitting the information wirelessly to AP 108, which may transmit the information via the DS 110 to AP 118, which in turn may transmit the information wirelessly to station 114 in BSS 112. The first 802.11 WLAN station 104 may communicate information wirelessly to the 802 LAN or WAN station 124 in LAN or WAN 122 by transmitting the information wirelessly to AP 108, which may transmit the information via the DS 110 to the portal 126, which in turn may transmit the information to the 802 LAN or WAN station 124 in LAN or WAN 122. The DS 110 may utilize wireless communications via an RF channel, wired communications, such as IEEE 802.3 or Ethernet, or a combination thereof.

A WLAN station, such as 104, 114, or AP, such as 108, 118, may utilize one or more transmitting antennas, and one or more receiving antennas when communicating information. A WLAN station or AP that utilizes a plurality of transmitting antennas and/or a plurality of receiving antennas may be referred to as a multiple input multiple output (MIMO) system.

Figure 2:
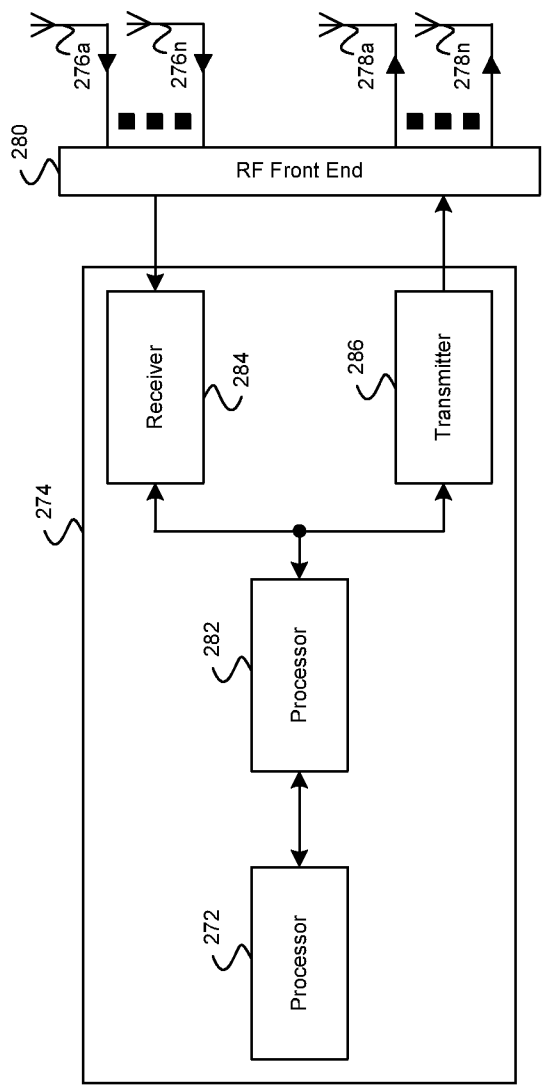
FIG. 2 is a block diagram of an exemplary wireless transceiver system that may be utilized in connection with an embodiment of the invention.

FIG. 2 is a block diagram of an exemplary wireless transceiver system that may be utilized in connection with an embodiment of the invention. The wireless transceiver may be utilized in connection with a portal 126, an access point 106, and/or an 802.11 WLAN station 104, for example. An exemplary embodiment of a transceiver may be a wireless network interface subsystem. With reference to FIG. 2 there is shown a transceiver 274, an RF front end 280, one or more receiving antennas 276a, . . . , 276n, and one or more transmitting antennas 278a, . . . , 278n. The transceiver 274 may comprise a processor 282, memory 272, a receiver 284, and a transmitter 286.

The processor 282 may perform digital receiver and/or transmitter functions in accordance with applicable communications standards. These functions may comprise, but are not limited to, tasks performed at lower layers in a relevant protocol reference model. These tasks may further comprise the physical layer convergence procedure (PLCP), physical medium dependent (PMD) functions, and associated layer management functions. These tasks may further comprise medium access control (MAC) layer functions as specified by pertinent standards.

The memory 272 may comprise suitable logic, circuitry, and/or code that may be utilized to enable storage and/or retrieval of data and/or code. Stored code may, for example, comprise an implementation for a bridging and/or routing protocol. Stored data may, for example, comprise data compiled based on execution of code for a routing and/or bridging protocol. Stored data may also comprise received data, and/or data to be transmitted. Retrieved data and/or code may be assigned physical resources within the memory 272 for the storage. The stored data and/or code may be subsequently available for retrieval. Retrieved data and/or code may be output by the memory 272 and communicated to other devices, components, and/or subsystems that may be communicatively coupled, directly and/or indirectly, to the memory 272. The memory 272 may enable the stored data and/or code to remain stored and/or available for subsequent retrieval until the resources allocated for the storage are deallocated. Physical resources may be deallocated based on a received instruction that the stored data and/or code be erased from the memory 272, or based on a received instruction that the physical resources be allocated for the storage of subsequent data and/or code. The memory may utilize a plurality of storage medium technologies such as volatile memory, for example, random access memory (RAM), and/or nonvolatile memory, for example, electrically erasable programmable read only memory (EEPROM).

The receiver 284 may perform digital receiver functions that may comprise, but are not limited to, fast Fourier transform processing, beamforming processing, equalization, demapping, demodulation control, deinterleaving, depuncture, and decoding. The transmitter 286 may perform digital transmitter functions that comprise, but are not limited to, coding, puncture, interleaving, mapping, modulation control, inverse fast Fourier transform processing, beamforming processing. The RF front end 280 may receive analog RF signals via the one or more antennas $276a, \ldots, 276n$, by converting the RF signal to baseband and generating a digital equivalent of the received analog baseband signal. The RF front end 280 may also transmit analog RF signals via an antenna $278a, \ldots, 278n$, by converting a digital baseband signal to an analog RF signal.

In operation, the processor 282 may receive data from the receiver 284. The processor 282 may communicate received data to the memory 272 for storage. The processor 282 may enable retrieval of data from the memory 272 to be transmitted via an RF channel by the transmitter 286. The memory 272 may communicate the data to the processor 282. The processor 282 may generate signals to control the operation of the modulation process in the transmitter 286, and of the demodulation process in the receiver 284.

Figure 3:
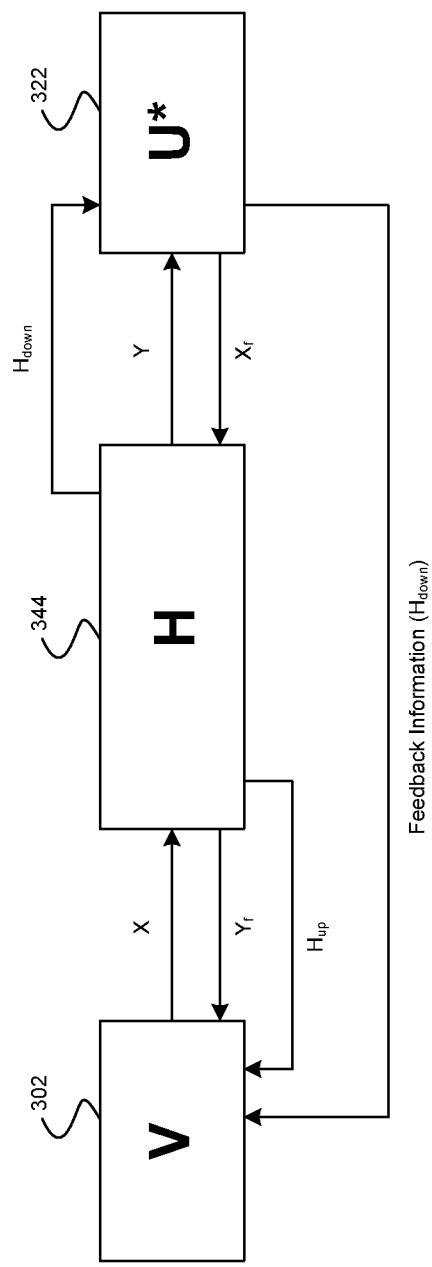
FIG. 3 is an exemplary diagram illustrating channel feedback, which may be utilized in connection with an embodiment of the invention.

FIG. 3 is an exemplary diagram illustrating channel feedback, which may be utilized in connection with an embodiment of the invention. Referring to FIG. 3, there is shown a transmitting mobile terminal 302, a receiving mobile terminal 322, and a communications medium 344. The communications medium 344 may represent a wireless communications medium. The transmitting mobile terminal 302 may transmit a signal vector X to the receiving mobile terminal 322 via the communications medium 344. The communications direction from the transmitting mobile terminal 302 to the receiving mobile terminal 322 may be referred to as a downlink direction. The signal vector X may comprise a plurality of spatial streams simultaneously transmitted via one or more transmitting antennas. The signal vector X may be beamformed by the transmitting mobile terminal 302 based on a beamforming matrix V. The signal vector X may travel through the communications medium 344. The signal vector X may be altered while traveling through the communications medium 344. The transmission characteristics associated with the communications medium 344 may be characterized by a transfer function H. The signal vector X may be altered based on the transfer function H. In the downlink direction, the transfer function H may be referred to as $H_{down}$. The altered signal vector X may be represented as the signal Y. The receiving mobile terminal 322 may receive the signal Y. The receiving mobile terminal 322 may determine one or more values associated with the transfer function $H_{down}$ based on the signal Y received via the communications medium 344.

The receiving mobile terminal 322 may compute one or more values associated with a matrix V based on the information related to the transfer function $H_{down}$. The receiving mobile terminal 322 may communicate information related to the matrix V to the transmitting mobile terminal 302 as feedback information. The feedback information ($H_{down}$) may represent feedback information based on the information related to the transfer function $H_{down}$. The receiving mobile terminal 322 may communicate the feedback information ($H_{down}$) via a transmitted signal vector $X_f$. The transmitted signal vector $X_f$ may be transmitted to the transmitting mobile terminal 302 via the communications medium 344. The signal vector $X_f$ may be altered while traveling through the communications medium 344. The communications direction from the receiving mobile terminal 322 to the transmitting mobile terminal 302 may be referred to as an uplink direction. The signal vector $X_f$ may be altered based on the transfer function H. In the uplink direction, the transfer function H may be referred to as $R_{up}$. The altered signal vector $X_f$ may be represented as the signal $Y_f$. The transmitting mobile terminal 302 may receive the signal $Y_f$.

The transmitting mobile terminal 302 may determine one or more values associated with the transfer function $H_{up}$ based on the signal $Y_f$ received via the communications medium 344. The transmitting mobile terminal 302 may utilize the received feedback information ($H_{down}$) to beamform subsequent signal vectors X, which may be transmitted in the downlink direction from the transmitting mobile terminal 302 to the receiving mobile terminal 322.

Figure 4:
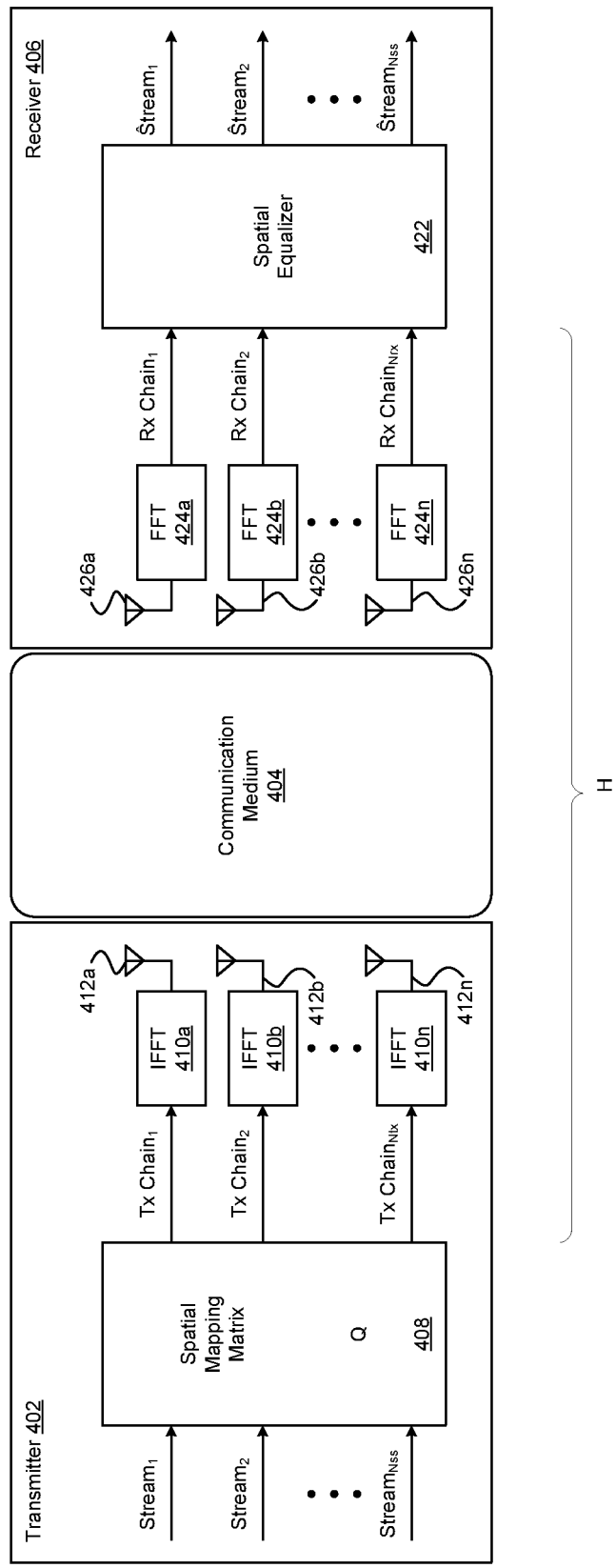
FIG. 4 is an exemplary diagram illustrating beamforming that may be utilized in connection with an embodiment of the invention.

FIG. 4 is an exemplary diagram illustrating beamforming that may be utilized in connection with an embodiment of the invention. Referring to FIG. 4, there is shown a transmitting mobile terminal 402, a receiving mobile terminal 406, and a wireless communication medium 404. An exemplary transmitting mobile terminal 402 may be a AP 108. An exemplary receiving mobile terminal 406 may be an 802.11 WLAN station 104. The transmitting mobile terminal 402 may be a MIMO system. The receiving mobile terminal 406 may be a MIMO system. The transmitting mobile terminal 402 comprises a transmit spatial mapping matrix 408, a plurality of inverse fast Fourier transform (IFFT) blocks $410a$, $410b, \ldots$, and $410n$, and a plurality of transmitting antennas $412a, 412b, \ldots$, and $412n$. The receiving mobile terminal 406 comprises a spatial equalizer 422, a plurality of fast Fourier transform (FFT) blocks $422a, 422b, \ldots$, and $422n$, and a plurality of receiving antennas $426a, 426b, \ldots$, and $426n$.

The spatial mapping matrix 408 may comprise a steering matrix Q that performs computations on a plurality of spatial streams, where Nss is a variable representing the number of spatial streams, and generates a plurality of transmitted RF chains, wherein Ntx is a variable representing the number of transmitted RF chains. The plurality of spatial streams may comprise a first spatial stream, $Stream_1$, a second spatial stream, $Stream_2$, an $Nss^{th}$ spatial stream, $Stream_{Nss}$. The plurality of transmitted RF chains may comprise a first transmitted RF chain, Tx $Chain_1$, a second transmitted RF chain, Tx $Chain_2$ 308, an $Ntx^{th}$ transmitted RF chain, Tx $Chain_{Ntx}$. Each of the transmitted RF chains Tx $Chain_1$, Tx $Chain_2, \ldots$, and Tx $Chain_{Ntx}$, may comprise a corresponding weighted sum computed from the plurality of spatial streams $Stream_1$, $Stream_2, \ldots$, and $Stream_{Nss}$, based on coefficients in the steering matrix Q.

The IFFT block $410a$ may perform IFFT calculations to transform a frequency-domain representation of the transmitted RF chain, Tx $Chain_1$, to a time-domain representation. The time-domain representation of the transmitted RF chain, $x_1$, may be transmitted via the transmitting antenna $412a$ to the wireless communications medium 404. The IFFT block $410b$ may perform IFFT calculations to transform a frequency-domain representation of the transmitted RF chain, Tx $Chain_2$, to a time-domain representation. The time-domain representation of the transmitted RF chain, $x_2$, may be transmitted via the transmitting antenna $412b$ to the wireless communications medium 404. The IFFT block $410n$ may perform IFFT calculations to transform a frequency-domain representation of the transmitted RF chain, Tx Chain$_{Ntx}$, to a time-domain representation. The time-domain representation of the transmitted RF chain, x$_{Ntx}$, may be transmitted via the transmitting antenna 412n to the wireless communications medium 404. The plurality of simultaneously transmitted RF chains may be represented by a transmitted signal vector X.

The receiving antenna 426a may receive a signal y$_1$ via the wireless communications medium 404. The FFT block 424a may perform FFT calculations to transform a time-domain of the received signal, y$_1$, to a frequency-domain representation of a received RF chain, Rx Chain$_1$. The receiving antenna 426b may receive a signal y$_2$ via the wireless communications medium 404. The FFT block 424b may perform FFT calculations to transform a time-domain of the received signal, y$_2$, to a frequency-domain representation of a received RF chain, Rx Chain$_2$. The receiving antenna 426n may receive a signal y$_{Nrx}$ via the wireless communications medium 404. Nrx may be a variable representing the number of receiving antennas at the receiving mobile terminal 406. The FFT block 424n may perform FFT calculations to transform a time-domain of the received signal, y$_{Nrx}$, to a frequency domain representation of a received RF chain, Rx Chain$_{Nrx}$. The plurality of received RF chains may be represented by a received signal vector Y.

The spatial equalizer 422 may comprise an equalization matrix U that performs computations on a received plurality of Nrx RF chains, and generates a plurality of Nss estimated spatial streams. The plurality of received RF chains may comprise a first received RF chain, Rx Chain$_1$, a second received RF chain, Rx Chain$_2$ 308, an Ntx$^{th}$ received RF chain, Rx Chain$_{Ntx}$. The plurality of estimated spatial streams may comprise a first estimated spatial stream, Ŝtream$_1$, a second estimated spatial stream, Ŝtream$_2$, and an Nss$^{th}$ estimated spatial stream, Ŝtream$_{Nss}$. Each of the plurality of estimated spatial streams at the receiving mobile terminal 406 may comprise an estimated value for a corresponding spatial stream at the transmitting mobile terminal 402.

Various embodiments of the invention may be practiced when the plurality of spatial streams Stream$_1$, Stream$_2$, ..., and Stream$_{Nss}$ is replaced by a plurality of space time streams STStream$_1$, STStream$_2$, ..., and STStream$_{Nsts}$, which may be generated based on space time coding (STC) and/or space time block coding (STBC), where Nsts may be a variable that represents the number of space time streams. The plurality of Nsts space time streams may be generated based on the plurality of Nss spatial streams.

The plurality of spatial streams at the transmitting mobile terminal 402, Stream$_1$, Stream$_2$, ..., and Stream$_{Nss}$, may be represented by stream vector G as represented in the following equation:

$$G = \begin{bmatrix} Stream_1 \\ Stream_2 \\ \vdots \\ Stream_{Nss} \end{bmatrix} \quad \text{Equation [1]}$$

The plurality of transmitted signal vector X may be represented as in the following equation:

$$X = \begin{bmatrix} TxChain_1 \\ TxChain_2 \\ \vdots \\ TxChain_{Ntx} \end{bmatrix} \quad \text{Equation [2]}$$

where:

$$X = Q \cdot G \quad \text{Equation [3]}$$

where Q may represent the steering matrix utilized by the spatial mapping matrix block 408, which may be represented as in the following equation:

$$Q = \begin{bmatrix} w_{11} & w_{12} & \cdots & w_{1,Nss} \\ w_{21} & w_{22} & \cdots & w_{2,Nss} \\ \vdots & \vdots & \ddots & \vdots \\ w_{Ntx,1} & w_{Ntx,2} & \cdots & w_{Ntx,Nss} \end{bmatrix} \quad \text{Equation [4]}$$

where each element, w, in the matrix of equation [4] may represent a beamforming coefficient.

The received signal vector Y may be represented as in the following equation:

$$Y = \begin{bmatrix} RxChain_1 \\ RxChain_2 \\ \vdots \\ RxChain_{Nrx} \end{bmatrix} \quad \text{Equation [5]}$$

where:

$$Y = H \cdot Q \cdot G + N \quad \text{Equation [6]}$$

where N may represent noise that may exist in the wireless communication medium 404, and H may represent the channel estimate matrix, which may be represented as in the following equation:

$$H = \begin{bmatrix} h_{11} & h_{12} & \cdots & h_{1,Ntx} \\ h_{21} & h_{22} & \cdots & h_{2,Ntx} \\ \vdots & \vdots & \ddots & \vdots \\ h_{Nrx,1} & h_{Nrx,2} & \cdots & h_{Nrx,Ntx} \end{bmatrix} \quad \text{Equation [7]}$$

where each element, h, may describe channel fading properties of the wireless communications medium 404 for signals transmitted by a transmitting antenna at the transmitting mobile terminal 402, and received by a receiving antenna at the receiving mobile terminal 406. As illustrated in FIG. 4, the channel estimate matrix H may be measured from a point corresponding to the output of the spatial mapping matrix 408, to a point corresponding to the input to the spatial equalizer 422.

The plurality of estimated spatial streams at the receiving mobile terminal 406, Ŝtream$_1$, Ŝtream$_2$, ..., and Ŝtream$_{Nss}$, may be represented by stream vector Ĝ as in the following equation:

$$\hat{G} = \begin{bmatrix} \hat{S}tream_1 \\ \hat{S}tream_2 \\ \vdots \\ \hat{S}tream_{Nss} \end{bmatrix} \quad \text{Equation [8]}$$

where:

$$\hat{G} = U^* \cdot H \cdot Q \cdot G + U^* \cdot N \quad \text{Equation [9a]}$$

or $$\hat{G} = U^* \cdot H_{eff} \cdot G + U^* \cdot N \quad \text{Equation [9b]}$$

where:

$$H_{eff} = H \cdot Q \quad \text{Equation [10]}$$

where U* may represent an Hermitian transform of the equalization matrix U, which may be utilized by the spatial equalizer block 422 and may be represented as in the following equation:

$$U^* = \begin{bmatrix} u^*_{11} & u^*_{12} & \cdots & u^*_{1,Ntx} \\ u^*_{21} & u^*_{22} & \cdots & u^*_{2,Ntx} \\ \vdots & \vdots & \ddots & \vdots \\ u^*_{Nss,1} & u^*_{Nss,2} & \cdots & u^*_{Nss,Ntx} \end{bmatrix} \quad \text{Equation [11]}$$

where each element, u, in the matrix of equation [4] may represent an equalization coefficient.

The matrix $H_{eff}$ may be represented as a matrix comprising Nrx rows and Nss columns. Alternatively, the matrix $H_{eff}$ may be described as an Nrx×Nss matrix. When the number of spatial streams Nss equals the number of transmitting antennas Ntx, the matrix $H_{eff}$ may be represented as an Nrx x Ntx matrix.

In an exemplary embodiment of the invention utilizing singular value decomposition (SVD), the matrix $H_{eff}$ may be represented as in the following equation:

$$H_{eff} = U \cdot S \cdot V^* \quad \text{Equation [12]}$$

where U may represent an equalization matrix, S may represent a diagonal matrix, and V* may represent an Hermitian transpose of a beamforming matrix V.

In other exemplary embodiments of the invention, the matrix V may be determined based on the matrix $H_{eff}$, such as when utilizing geometric mean decomposition (GMD), for example.

In conventional MIMO systems, the steering matrix utilized by the spatial mapping matrix block 408 within the transmitting mobile terminal 402 may be computed based on feedback information received from the receiving mobile terminal 406. The receiving mobile terminal 406 may compute the matrix V from equation [12] based on measured CSI derived from the received signal vector Y, which may be utilized to compute the matrix $H_{eff}$, and on the equalization matrix U, utilized by the spatial equalizer block 422. The matrix Q may be an identity matrix. The matrix V may be sent from the receiving mobile terminal 406 to the transmitting mobile terminal 402 in the feedback information. The matrix V may be represented as an Ntx×Nss matrix.

The transmitting mobile terminal 402 may utilize the matrix V received in feedback information as a subsequent steering matrix that is utilized for transmitting a subsequent transmitted signal vector X. In this case:

$$\hat{G} = U^* \cdot H \cdot V \cdot G + U^* \cdot N \quad \text{Equation [13]}$$

Based on equations [10] and [12]:

$$H \cdot Q = U \cdot S \cdot V^* \quad \text{Equation [14a]}$$

and $$H \cdot Q \cdot Q^* = U \cdot S \cdot V^* \cdot Q^* \quad \text{Equation [14b]}$$

$$H = U \cdot S \cdot V^* \cdot Q^* \quad \text{Equation [14c]}$$

where:

$$Q \cdot Q^* = I \quad \text{Equation [15]}$$

based on the orthonormal property of the matrix Q. The matrix I represents an identity matrix.

By combining equations [13] and [14c]:

$$\hat{G} = U^* \cdot U \cdot S \cdot V^* \cdot Q^* \cdot V \cdot G + U^* \cdot N \quad \text{Equation [16a]}$$

and $$\hat{G} = S \cdot V^* \cdot Q^* \cdot V \cdot G + U^* \cdot N \quad \text{Equation [16b]}$$

where the matrices U and V may also be described as orthonormal matrices.

When Q is an identity matrix as is the case in conventional MIMO systems, which transmit sounding frames without beamforming, equation [16b] may be represented:

$$\hat{G} = S \cdot G + U^* \cdot N \quad \text{Equation [16c]}$$

where S is a diagonal matrix as described in equation [12]. If the feedback matrix V is utilized as a subsequent steering matrix when the matrix Q is not an identity matrix, the first term in equation [16b], S·V*·Q*·V, may not be a diagonal matrix. Thus, in conventional MIMO systems, the ability to perform channel sounding may depend on the matrix Q being an identity matrix.

Alternatively, the receiving mobile terminal 406 may send the CSI, as represented by the matrix $H_{eff}$ in the feedback information. When Q is an identity matrix, as may be the case in conventional MIMO systems, the receiving mobile terminal may send the matrix H in the feedback information. When the receiving mobile terminal 406 sends the matrix H in the feedback information, the transmitting mobile terminal 402 may compute the subsequent steering matrix based on the CSIT.

Various embodiments of the invention may enable channel sounding to be performed when the matrix Q is not an identity matrix. In various embodiments of the invention, the receiving mobile terminal 406 may compute a steering matrix, $Q_{Steer}$, which may be defined as in the following equation:

$$Q_{Steer} = Q \cdot V \quad \text{Equation [17]}$$

where the matrix Q may be as defined in equation [4]. The matrix Q may represent a current steering matrix utilized by the transmitting mobile terminal 402 for generating transmitted signal vectors X. The matrix $Q_{Steer}$ may represent a subsequent steering matrix, which may be utilized by the transmitting mobile terminal 402 for generating subsequent transmitted signal vectors X. The feedback steering matrix V may be represented by an Nss×Nss matrix. The receiving mobile terminal 406 may send the feedback steering matrix V, as computed in equation [17], in feedback information to the transmitting mobile terminal 402. The transmitting mobile terminal may utilize the received feedback information, comprising the feedback steering matrix V, in conjunction with the current steering matrix Q, to compute the subsequent steering matrix $Q_{steer}$. The subsequent steering matrix may be utilized by the transmitting mobile terminal 402 for generating subsequent transmitted signal vectors X.

By utilizing the subsequent steering matrix, $Q_{Steer}$, as defined in equation [17], and the channel estimate matrix, H, as defined in equation [14c], in equation [9a]:

$$\hat{G} = U^* \cdot H \cdot Q_{Steer} \cdot G + U^* \cdot N \quad \text{Equation [18a]}$$

and:

$$\hat{G} = U^* \cdot U \cdot S \cdot V^* \cdot Q^* \cdot Q_{Steer} \cdot G + U^* \cdot N \quad \text{Equation [18b]}$$

and:

$$\hat{G} = U^* \cdot U \cdot S \cdot V^* \cdot Q^* \cdot Q \cdot V \cdot G + U^* \cdot N \quad \text{Equation [18c]}$$

and:

$$\hat{G} = S \cdot V^* \cdot V \cdot G + U^* \cdot N \quad \text{Equation [18d]}$$

and:

$$\hat{G} = S \cdot G + U^* \cdot N \quad \text{Equation [18e]}$$

Alternatively, in various embodiments of the invention, the receiving mobile terminal 406 may send the CSI, as represented by the matrix $H_{eff}$ in the feedback information, where $H_{eff}$ may be as defined in equation [10]. When the receiving mobile terminal 406 sends the matrix H in the feedback information, the transmitting mobile terminal 402 may compute the subsequent steering matrix, $Q_{Steer}$ as defined in equation [17], based on the CSIT.

In conventional MIMO systems, a receiving mobile terminal 406 may send feedback information comprising a subsequent steering matrix V, as represented by an Ntx×Nss matrix. In various embodiments of the invention, a receiving mobile terminal 406 may send feedback information comprising a feedback steering matrix V, as represented by an Nss×Nss matrix. For MIMO systems in which the number of spatial streams is less than the number of transmitting antennas, or Nss<Ntx, the quantity of feedback information may be reduced in various embodiments of the invention in comparison to conventional MIMO systems. This may result in a reduction of overhead transmission for feedback information for various embodiments of the invention. This may, in turn, result in higher information transfer rates for data transmitted between the transmitting mobile terminal 402 and the receiving mobile terminal 406 when compared to conventional MIMO systems.

In addition, in conventional MIMO systems, beamforming may not be utilized by the transmitting mobile terminal 402 when transmitting sounding frames. Thus data may not be transmitted between the transmitting mobile terminal 402 and the receiving mobile terminal 406 when sounding frames are being transmitted. By contrast, in various embodiments of the invention, beamforming may be utilized when transmitting sounding frames. This may enable data to be transmitted between the transmitting mobile terminal 402 and the receiving mobile terminal 406 while sounding frames are also being transmitted. This may reduce the amount of time during which data may not be transmitted during communications between a transmitting mobile terminal 402 and a receiving mobile terminal 406 when compared to conventional MIMO systems. This may, in turn, result in higher information transfer rates for data transmitted between the transmitting mobile terminal 402 and the receiving mobile terminal 406 when compared to conventional MIMO systems.

Figure 5:
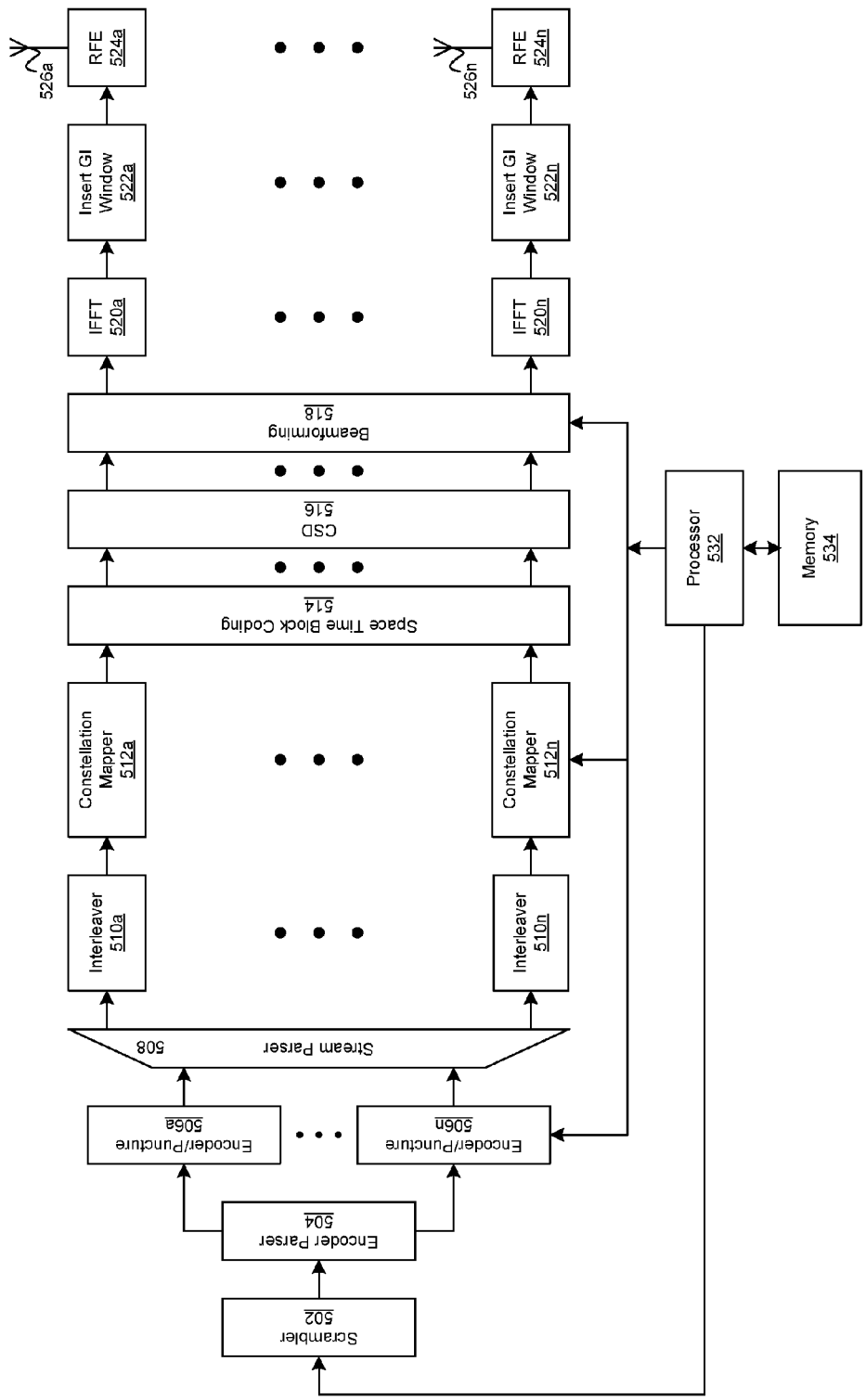
FIG. 5 is an exemplary block diagram of a MIMO transmitter, which may be utilized in connection with an embodiment of the invention.

FIG. 5 is an exemplary block diagram of a MIMO transmitter, which may be utilized in connection with an embodiment of the invention. Referring to FIG. 5, there is shown a scrambler 502, an encoder parser 504, a plurality of encoder/puncture blocks 506a, . . . , and 506n, a stream parser 508, a plurality of interleaver blocks 510a, . . . , and 510n, a plurality of constellation mapper blocks 512a, . . . , and 512n, a space time block coding (STBC) block 514, a cyclical shift diversity (CSD) block 516, a beamforming block 518, a plurality of IFFT blocks 520a, . . . , and 520n, a plurality of insert guard interval window blocks 522a, . . . , and 522n, a plurality of radio front end (RFE) blocks 524a, . . . , and 524n, a plurality of transmitting antennas 526a, . . . , and 526n, a processor 532, and a memory 534.

The scrambler 502 may comprise suitable logic, circuitry, and/or code that may enable scrambling of a pattern of binary 0's and 1's contained within transmitted data to prevent long sequences of consecutive 0's or 1's. The encoder parser 504 may comprise suitable logic, circuitry, and/or code that may enable receiving bits from a single input stream, and distributing each of the bits to one of a plurality of output streams.

The encoder/puncture block 506a may comprise suitable logic, circuitry, and/or code that may enable received data to be encoded to enable error correction. An encoder/puncture block 506a may encode data based on a forward error correction (FEC) coding method, such as binary convolutional coding (BCC), or low density parity check (LDPC) coding. The encoder/puncture block 506a may also perform puncturing of encoded data to modify a coding rate associated with, for example, BCC encoding. The encoder/puncture block 506n may be substantially similar to the encoder/puncture block 506a.

The stream parser 508 may comprise suitable logic, circuitry, and/or code that may receive one or more input data streams, and distribute each bit from each input data stream to one of a plurality of spatial streams.

The interleaver 510a may comprise suitable logic, circuitry, and/or code that may enable reordering of bits in a received spatial stream. The interleaver 510a may reorder bits so that if binary values for a block of contiguous transmitted bits are corrupted during transmission, the block of contiguous transmitted bits may be separated by a deinterleaver. The separation of corrupted bits may enable a FEC coding method to be utilized to correct the binary values of bits corrupted during transmission. The interleaver 510n may be substantially similar to the interleaver 510a.

The constellation mapper block 512a may comprise suitable logic, circuitry, and/or code that may enable a sequence of bits in a received data stream to be mapped to a constellation point. The constellation point may be determined based on a modulation type utilized for transmitting data associated with the spatial stream, for example 64-level quadrature amplitude modulation (64-QAM). The constellation point may be referred to as a symbol. For example, for 64-QAM, a symbol may correspond to a binary value for a sequence of 6 bits. The constellation mapper block 512n may be substantially similar to the constellation mapper block 512n.

The STBC block 514 may comprise suitable logic, circuitry, and/or code that may enable reception of symbols from a plurality of input spatial streams. Each symbol from each spatial stream may be output to at least one of plurality of space time streams at a given time instant when STBC is utilized by the MIMO transmitter. At a subsequent time instant a symbol from the spatial stream may be output to a different space time stream. In addition to mapping a symbol from a given spatial stream to different space time streams at different time instants, the STBC block 514 may modify the value of the symbol at different time instants. For example, at one time instant, the STBC block 514 may output the value of the symbol from a spatial stream on a first space time stream, while during a succeeding time instant the STBC block 514 may output a value that is a complex conjugate of the symbol, or a negative value of the complex conjugate of the symbol, which may be output on a second space time stream.

The CSD block 516 may comprise suitable logic, circuitry, and/or code that may enable input of a stream, and output of a time-shifted version of the stream. For example, the CSD block 516 may receive an input stream and output a time-delayed version of the input stream. CSD may be utilized to avoid unintentional beamforming when similar signals are simultaneously transmitted via a plurality of streams and/or RF chains.

The beamforming block 518 may comprise suitable logic, circuitry, and/or code that may enable a plurality of RF chains to be generated based on an input plurality of streams. The beamforming block 518 may utilize a steering matrix, where the steering matrix is not an identity matrix. The IFFT blocks 520a, . . . , and 520n may be substantially similar to the IFFT block 410a.

The insert GI window block 522a may comprise suitable logic, circuitry, and/or code that may enable insertion of guard intervals in a transmitted RF chain signal. The guard interval may represent a time interval between transmission of symbols within the transmitted RF chain signal. The insert GI window block 522n may be substantially similar to the insert GI window block 522a.

The RFE block 524a may comprise suitable logic, circuitry, and/or code that may enable generation of an RF signal from an RF chain signal. The RFE block 524a may generate the RF signal by utilizing a plurality of frequency carrier signals to modulate the RF chain signal. The RFE block 524a may be utilized to enable generation of a 20 MHz bandwidth RF signal, or of a 40 MHz bandwidth RF signal, for example. The modulated signal may be transmitted via the transmitting antenna 526a. The RFE block 524n may be substantially similar to the RFE block 524a. The transmitting antenna 526n may be substantially similar to the transmitting antenna 526a.

The processor 532 may comprise suitable logic, circuitry, and/or code that may enable generation of control signals for the MIMO transmitter. The processor 532 may generate control signals to determine specifications for FEC coding and/or puncturing that may be performed within the MIMO transmitter. The processor 532 may generate control signals to determine one or more modulation types to be utilized within the MIMO transmitter. The processor 532 may perform computations that determine beamforming coefficients to be utilized in connection with beamforming of RF streams within the MIMO transmitter. The processor 532 may generate data that may be transmitted by the MIMO transmitter. The processor may perform computations on feedback information received by a MIMO receiver 284 (FIG. 2). The memory 534 may be substantially similar to the memory 272.

In operation, the processor 532 may select a coding rate for BCC encoding, for example. The processor 532 may select a different coding rate for each spatial stream. The processor 532 may send control signals to the encoder/puncture blocks 506a, . . . , and 506n to enable FEC coding based on the selected coding rate. The processor 532 may select a modulation type. The processor 532 may select a different modulation type for each spatial stream. The processor may send control signals to the constellation mapper blocks 512a, . . . , and 512n to enable the selected modulation types. The processor may retrieve data stored in memory 534 when selecting coding rates, and/or modulation types. The processor 532 may compute a steering matrix based on feedback information and/or stored data in memory 534. The processor 532 may configure the beamforming block 518 based on coefficients in the computed steering matrix.

The processor 532 may generate data to be transmitted by the MIMO transmitter. The data may be communicated in a binary input stream to the scrambler block 502. The scrambler block 502 may scramble the data utilizing a scrambling polynomial and output the scrambled bits to the encoder parser block 504. The encoder parser block 504 may distribute the scrambled bits among the encoder/puncture blocks 506a, . . . , and 506n. The encoder parser block 504 may distribute the scrambled bits in a round robin fashion, for example. Each encoder parser block 504 may utilize a corresponding selected FEC coding method for encoding received bits. The plurality of encoder/puncture blocks 506a, . . . , and 506n may be output to the stream parser 508, which may distribute the encoded bits among a plurality of Nss spatial streams, for example. Each of the interleavers 510a, . . . , and 510n may perform bit interleaving on the bits within the corresponding spatial stream. Each of the constellation mapper blocks 512a, . . . , and 512n may utilize a corresponding selected modulation type to generate symbols for bits received in each spatial stream.

If STBC is utilized by the MIMO transmitter, the STBC block 514 may generate a plurality of Nsts space time streams based on the Nss spatial streams received from the plurality of constellation mapper blocks 512a, . . . , and 512n. If CSD is utilized by the MIMO transmitter, the CSD block 516 may generate time shifted versions of one or more spatial streams or space time streams. The CSD block 516 may insert a time shift for one stream based on another stream. For example, a first stream not may be time shifted, while a second stream may be time delayed by 200 ns relative to the first stream.

The beamforming block 518 may generate a plurality of RF chain signals based on a plurality of received spatial streams and/or space time streams. Each of the plurality of IFFT blocks 520a, . . . , and 520n may generate a time-domain representation for one of the RF chain signals. Each of the plurality of insert GI window blocks 522a, . . . , and 522n may insert a GI between symbols transmitted via one of the RF chain signals. Each of the plurality of RFE blocks 524a, . . . , and 524n may generate an RF signal for one of the RF chain signals. Each of the plurality of antennas 526a, . . . , and 526n may be utilized for transmitting one of the generated RF signals via a wireless communications medium 404.

In various embodiments of the invention, the processor 532 may configure the MIMO transmitter to transmit a sounding frame in a physical (PHY) layer protocol data unit (PDU) while simultaneously sending data in a medium access control layer PDU contained in a service data unit (SDU) segment of the PHY PDU. The PHY PDU may be transmitted utilizing beamforming at the beamforming block 518.

Figure 6:
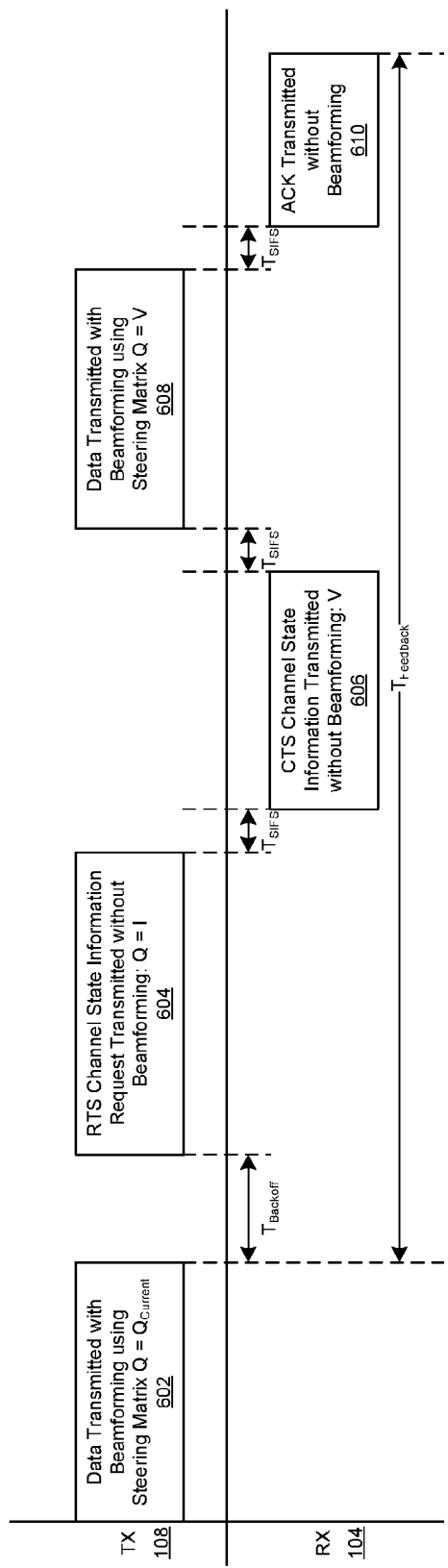
FIG. 6 is a diagram that illustrates exemplary frame exchange in a conventional channel sounding procedure, which may be utilized in connection with an embodiment of the invention.

FIG. 6 is a diagram that illustrates exemplary frame exchange in a conventional channel sounding procedure, which may be utilized in connection with an embodiment of the invention. Referring to FIG. 6, there is shown a plurality of frames sent by a MIMO transmitter, for example an AP 108 (FIG. 1), and by a MIMO receiver, for example an 802.11 WLAN station 104. In frame 602, the MIMO transmitter 108 may transmit data via transmitted RF chains utilizing beamforming. The beamforming may utilize a current steering matrix $Q_{Current}$. At the end of transmission of the frame 602, a feedback time interval, the duration of which is indicated as $T_{Feedback}$ in FIG. 6, may begin. The time interval, $T_{Feedback}$, may measure the amount of time utilized for performing a channel sounding procedure.

At the beginning of the feedback time interval, a backoff time duration, which is indicated as $T_{Backoff}$ in FIG. 6, may elapse. The backoff time duration may specify a period of time that may elapse before the MIMO transmitter 108 may attempt to transmit a subsequent frame via the wireless communications medium 404. At the end of the backoff time duration, in frame 604, the MIMO transmitter 108 may transmit a sounding frame. The sounding frame may comprise a request to the recipient MIMO receiver 104 to generate channel state information to measure the downlink RF channel from the MIMO transmitter 108 to the MIMO receiver 104, $H_{Down}$ (FIG. 3). The sounding frame 604 may be transmitted without utilizing beamforming, or Q=I, where I is an identity matrix.

At the end of transmission of the sounding frame 604, a short interframe spacing (SIFS) time interval, the duration of which is indicated as $T_{SIFS}$ in FIG. 6, may begin. The SIFS time interval may specify a time duration that may elapse before the MIMO receiver 104 may transmit a frame in response to the sounding frame 604. At the end of the SIFS time interval, the MIMO receiver 104 may transmit a clear to send (CTS) response frame 606. The response frame 606 may comprise channel state information and/or a steering matrix, V, computed by the MIMO receiver 104, based on the CSI. In a response frame 606 that comprises a steering matrix V, the matrix V may be a 4×2 matrix when the number of transmitting antenna Ntx=4 at the MIMO transmitter 108, the number of spatial streams Nss=2, and the number of receiving antennas Nrx=2 at the MIMO receiver 104. The response frame 606 may be transmitted by the MIMO receiver 104 without utilizing beamforming.

At the end of transmission of the response frame 606, another SIFS time interval may begin. The SIFS time interval may specify a time duration that may elapse before the MIMO transmitter 108 may transmit a frame subsequent to receipt of the response frame 606 from the MIMO transmitter 104. At the end of the SIFS time interval, the MIMO transmitter 108 may transmit a data frame 608 comprising data from a MAC PDU. The data frame 608 may be transmitted via transmitted RF chains utilizing beamforming. The beamforming may be performed based on the steering matrix V received in the response frame 606, or based on a steering matrix V that was computed based on CSI contained in the response frame 606. The data frame 608 may also comprise PHY layer data, for example, the data frame 608 may comprise a request that the MIMO receiver 104 respond with information that may be utilized by the MIMO transmitter 108 for selecting one or more modulation types, and/or one or more coding rate that may be utilized in connection with a corresponding one or more spatial streams transmitted by the MIMO transmitter 108.

At the end of transmission of the data frame 608, another SIFS time interval may begin. The SIFS time interval may specify a time duration that may elapse before the MIMO receiver 104 may transmit a frame subsequent to receipt of the data frame 608 from the MIMO transmitter 108. At the end of the SIFS time interval, the MIMO receiver 104 may transmit an acknowledgement frame 610 to the MIMO transmitter 108. The acknowledgement frame 610 may acknowledge receipt of the data contained within the data frame 608, and may comprise modulation type and/or coding rate information. The acknowledgement frame 610 may also comprise CSI. The end of transmission of the acknowledgement frame 610 may correspond to the end of the channel sounding procedure.

Figure 7:
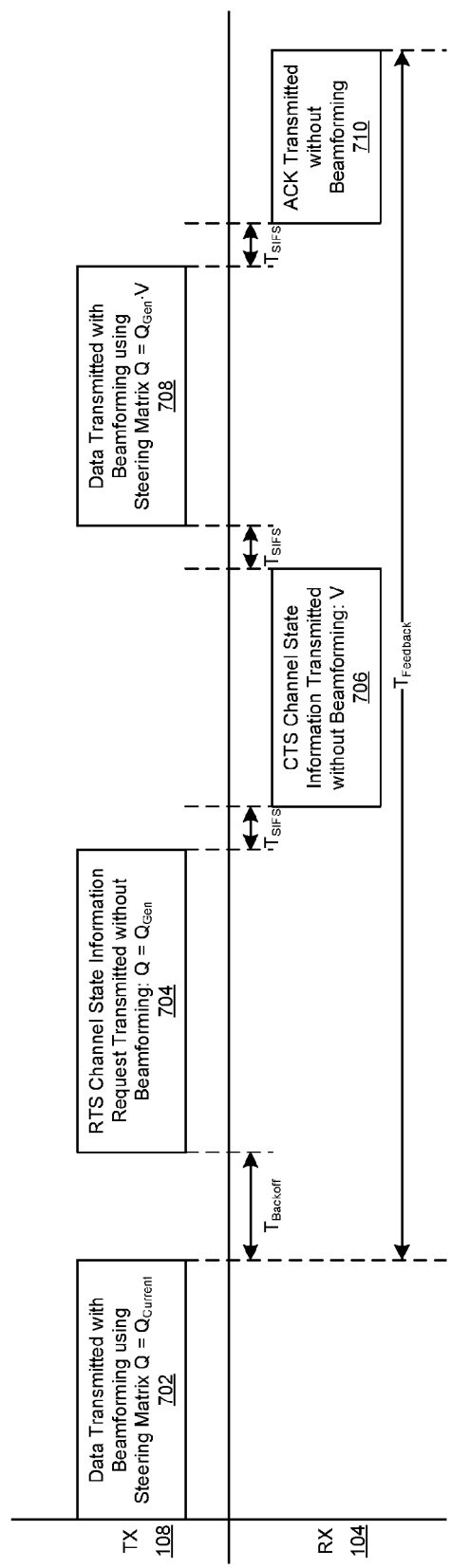
FIG. 7 is a diagram that illustrates exemplary frame exchange utilizing a non-identity steering matrix in a channel sounding procedure, in accordance with an embodiment of the invention.

FIG. 7 is a diagram that illustrates exemplary frame exchange utilizing a non-identity steering matrix in a channel sounding procedure, in accordance with an embodiment of the invention. Referring to FIG. 7, there is shown a plurality of frames sent by a MIMO transmitter, for example an AP 108 (FIG. 1), and by a MIMO receiver, for example an 802.11 WLAN station 104. In frame 702, the MIMO transmitter 108 may transmit data via transmitted RF chains utilizing beamforming. The beamforming may utilize a current steering matrix $Q_{Current}$. At the end of transmission of the frame 702, a feedback time interval, the duration of which is indicated as $T_{Feedback}$ in FIG. 7, may begin. The time interval, $T_{Feedback}$, may measure they amount of time utilized for performing a channel sounding procedure.

At the beginning of the feedback time interval, a backoff time duration, which is indicated as $T_{Backoff}$ in FIG. 7, may elapse. The backoff time duration may specify a period of time that may elapse before the MIMO transmitter 108 may attempt to transmit a subsequent frame via the wireless communications medium 404. At the end of the backoff time duration, in frame 704, the MIMO transmitter 108 may transmit a sounding frame. The sounding frame may comprise a request to the recipient MIMO receiver 104 to generate channel state information to measure the downlink RF channel from the MIMO transmitter 108 to the MIMO receiver 104, $H_{Down}$ (FIG. 3). The sounding frame 704 may be transmitted while utilizing a generalized steering matrix $Q_{Gen}$, or $Q=Q_{Gen}$, where $Q_{Gen}$ is not an identity matrix.

At the end of transmission of the sounding frame 704, a short interframe spacing (SIFS) time interval, the duration of which is indicated as $T_{SIFS}$ in FIG. 7, may begin. The SIFS time interval may specify a time duration that may elapse before the MIMO receiver 104 may transmit a frame in response to the sounding frame 704. At the end of the SIFS time interval, the MIMO receiver 104 may transmit a clear to send (CTS) response frame 706. The response frame 706 may comprise channel state information and/or a feedback steering matrix, V, computed by the MIMO receiver 104, based on the CSI, and based on a non-identity steering matrix $Q_{Gen}$. The feedback steering matrix V may be computed by the MIMO receiver 104 as described for equations [17], and [18a-e]. In a response frame 706 that comprises a feedback steering matrix V, the feedback steering matrix V may be a 2×2 matrix when the number of transmitting antenna Ntx=4 at the MIMO transmitter 108, the number of spatial streams Nss=2, and the number of receiving antennas Nrx=2 at the MIMO receiver 104. The response frame 706 may be transmitted by the MIMO receiver 104 without utilizing beamforming. The quantity of feedback information contained in the response frame 706 may be about ¼ of the quantity of feedback information contained in the response frame 606 as shown in Tables 1 and 2 below.

At the end of transmission of the response frame 706, another SIFS time interval may begin. The SIFS time interval may specify a time duration that may elapse before the MIMO transmitter 108 may transmit a frame subsequent to receipt of the response frame 706 from the MIMO transmitter 104. At the end of the SIFS time interval, the MIMO transmitter 108 may transmit a data frame 708 comprising data from a MAC PDU. The data frame 708 may be transmitted via transmitted RF chains utilizing beamforming. The beamforming may be performed based on the feedback steering matrix V computed based on the matrix product $Q_{Gen} \cdot V$, where V may represent the feedback steering matrix received in the response frame 706. The data frame 708 may also comprise PHY layer data, for example, the data frame 708 may comprise a request that the MIMO receiver 104 respond with information that may be utilized by the MIMO transmitter 108 for selecting one or more modulation types, and/or one or more coding rate that may be utilized in connection with a corresponding one or more spatial streams transmitted by the MIMO transmitter 108.

At the end of transmission of the data frame 708, another SIFS time interval may begin. The SIFS time interval may specify a time duration that may elapse before the MIMO receiver 104 may transmit a frame subsequent to receipt of the data frame 708 from the MIMO transmitter 108. At the end of the SIFS time interval, the MIMO receiver 104 may transmit an acknowledgement frame 710 to the MIMO transmitter 108. The acknowledgement frame 710 may acknowledge receipt of the data contained within the data frame 708, and may comprise modulation type and/or coding rate information. The acknowledgement frame 710 may also comprise CSI. The end of transmission of the acknowledgement frame 710 may correspond to the end of the channel sounding procedure.

Figure 8:
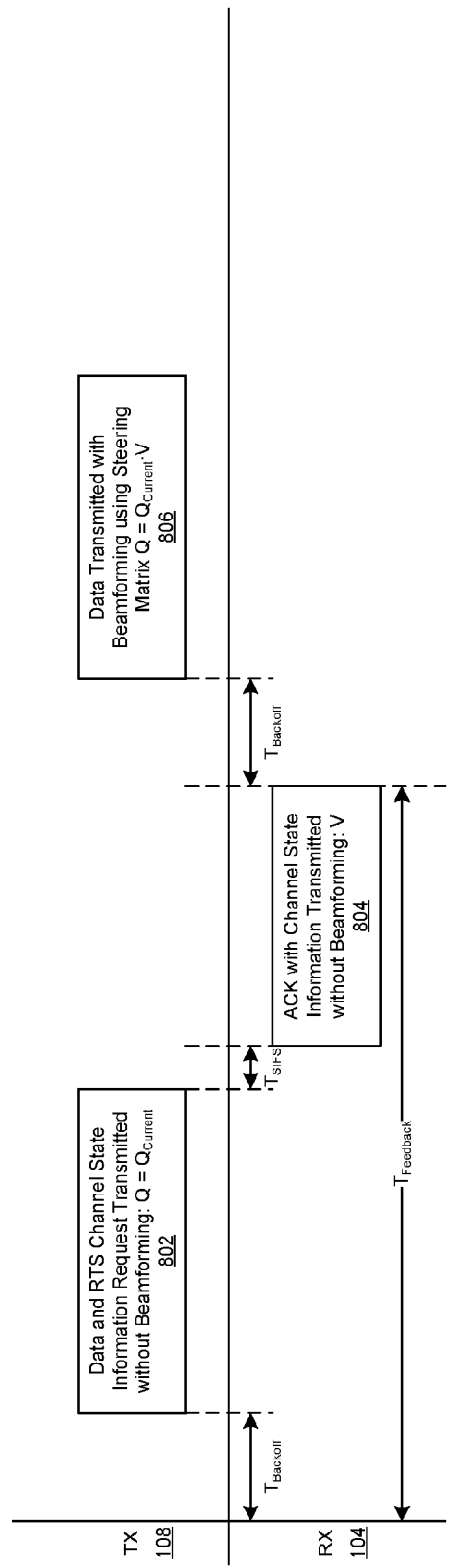
FIG. 8 is a diagram that illustrates exemplary frame exchange for transmitting data within channel sounding frames, in accordance with an embodiment of the invention.

FIG. 8 is a diagram that illustrates exemplary frame exchange for transmitting data within channel sounding frames, in accordance with an embodiment of the invention. Referring to FIG. 8, there is shown a plurality of frames sent by a MIMO transmitter, for example an AP 108 (FIG. 1), and by a MIMO receiver, for example an 802.11 WLAN station 104. The time interval $T_{Feedback}$, which is indicated in FIG. 8, may measure they amount of time utilized for performing a channel sounding procedure.

At the beginning of the feedback time interval, a backoff time duration, which is indicated as $T_{Backoff}$ in FIG. 8, may elapse. The backoff time duration may specify a period of time that may elapse before the MIMO transmitter 108 may attempt to transmit a frame via the wireless communications medium 404 to initiate the channel sounding procedure. At the end of the backoff time duration, in frame 802, the MIMO transmitter 108 may transmit a sounding frame. The sounding frame may comprise a request to the recipient MIMO receiver 104 to generate channel state information to measure the downlink RF channel from the MIMO transmitter 108 to the MIMO receiver 104, $H_{Down}$ (FIG. 3). The sounding frame 802 may also comprise data. The sounding frame 802 may be transmitted while utilizing a current steering matrix $Q_{Current}$, or $Q=Q_{Current}$, where $Q_{Current}$ is not an identity matrix. The current steering matrix, $Q_{Current}$, may be a steering matrix that is currently being utilized by the MIMO transmitter 108 to transmit data frames via the wireless communications medium 404.

At the end of transmission of the sounding frame 802, a short interframe spacing (SIFS) time interval, the duration of which is indicated as $T_{SIFS}$ in FIG. 8, may begin. The SIFS time interval may specify a time duration that may elapse before the MIMO receiver 104 may transmit a frame in response to the sounding frame 802. At the end of the SIFS time interval, the MIMO receiver 104 may transmit an acknowledgement frame 804. The acknowledgement frame 804 may also comprise channel state information and/or a feedback steering matrix, V, computed by the MIMO receiver 104, based on the CSI, and based on a non-identity steering matrix $Q_{Current}$. The feedback steering matrix V may be computed by the MIMO receiver 104 as described for equations [17], and [18a-e]. In an acknowledgement frame 804 that comprises a feedback steering matrix V, the feedback steering matrix V may be a 2×2 matrix when the number of transmitting antenna Ntx=4 at the MIMO transmitter 108, the number of spatial streams Nss=2, and the number of receiving antennas Nrx=2 at the MIMO receiver 104. The acknowledgement frame 804 may be transmitted by the MIMO receiver 104 without utilizing beamforming. The quantity of feedback information contained in the acknowledgement frame 804 may be about ¼ of the quantity of feedback information contained in the response frame 606 as shown in Tables 1 and 2 below. The end of transmission of the acknowledgement frame 804 may correspond to the end of the channel sounding procedure. Following another backoff time duration, the MIMO transmitter 108 may transmit data frames 806 utilizing a steering matrix computed based on the matrix product $Q_{Current} \cdot V$.

In various embodiments of the invention, the amount of time utilized in performing the channel sounding procedure of FIG. 8 may be less in comparison to the amount of time utilized in conventional channel sounding methods, such as is illustrated in FIG. 6.

Table 1 presents exemplary comparisons between the number of bytes contained in feedback information for different feedback array dimensions, which may be utilized in connection with an embodiment of the invention. The comparison in Table 1 may be based on a 20 MHz type E RF channel as specified in IEEE 802.11. The first row in Table 1 represents a number of bytes contained in feedback information, which is generated based on a Cartesian coordinate format representation. The second row in Table 1 represents a number of bytes contained in feedback information, which is generated based on Givens rotations without utilizing tone grouping. Tone grouping may not be utilized when a tone group size $\epsilon=1$, for example. The third row in Table 1 represents a number of bytes contained in feedback information, which is generated based on Givens rotations utilizing a tone group size $\epsilon=2$. The fourth row in Table 1 represents a number of bytes contained in feedback information, which is generated based on Givens rotations utilizing a tone group size $\epsilon=4$. The first column in Table 1 represents a size of a V matrix where N=2 and M=2, where N is a variable representing the number of rows, and M is a variable representing the number of columns. The second column in Table 1 represents a size of a V matrix where N=3 and M=3. The third column in Table 1 represents a size of a V matrix where N=4 and M=2. The fourth column in Table 1 represents a size of a V matrix where N=4 and M=4.

When the tone group size is 4, a V matrix that may be represented as a 2×2 matrix may comprise about 14 bytes of binary data. By comparison, a V matrix that may be represented as a 4×2 matrix may comprise about 53 bytes of binary data. Similarly, when the tone group size is 2, a V matrix that may be represented as a 2×2 matrix may comprise about 28 bytes of binary data. By comparison, a V matrix that may be represented as a 4×2 matrix may comprise about 105 bytes of binary data.

TABLE 1

| Quantity of Feedback Information for 20 MHz Type E Channel (Bytes) | | | | |
| --- | --- | --- | --- | --- |
| | 2 × 2 | 3 × 3 | 4 × 2 | 4 × 4 |
| Cartesian | 280 | 504 | 448 | 896 |
| Givens | 56 | 168 | 210 | 336 (252) |
| Tone Group Size = 2 | 28 | 84 | 105 | 168 (126) |
| Tone Group Size = 4 | 14 | 42 | 53 | 84 (63) |

Table 2 presents exemplary comparisons between the numbers of bytes contained in feedback information for various feedback array dimensions, which may be utilized in connection with an embodiment of the invention. Table 2 represents equivalent information from Table 1 where the RF channel is 40 MHz. The comparison in Table 2 may be based on a 40 MHz type E RF channel as specified in IEEE 802.11. The first row in Table 2 represents a number of bytes contained in feedback information, which is generated based on a Cartesian coordinate format representation. The second row in Table 2 represents a number of bytes contained in feedback information, which is generated based on Givens rotations without utilizing tone grouping. The third row in Table 2 represents a number of bytes contained in feedback information, which is generated based on Givens rotations utilizing a tone group size $\epsilon=2$. The fourth row in Table 2 represents a number of bytes contained in feedback information, which is generated based on Givens rotations utilizing a tone group size $\epsilon=4$.

The first column in Table 2 represents a size of a V matrix where N=2 and M=2. The second column in Table 2 represents a size of a V matrix where N=3 and M=3. The third column in Table 2 represents a size of a V matrix where N=4 and M=2. The fourth column in Table 2 represents a size of a V matrix where N=4 and M=4.

When the tone group size is 4, a V matrix that may be represented as a 2×2 matrix may comprise about 28 bytes of binary data. By comparison, a V matrix that may be represented as a 4×2 matrix may comprise about 105 bytes of binary data. Similarly, when the tone group size is 2, a V matrix that may be represented as a 2×2 matrix may comprise about 56 bytes of binary data. By comparison, a V matrix that may be represented as a 4×2 matrix may comprise about 210 bytes of binary data.

TABLE 2

Quantity of Feedback Information for 40 MHz Type E Channel (Bytes)

|  | 2 × 2 | 3 × 3 | 4 × 2 | 4 × 4 |
| --- | --- | --- | --- | --- |
| Cartesian | 570 | 1,026 | 912 | 1,824 |
| Givens | 114 | 342 | 428 | 684 (513) |
| Tone Group Size = 2 | 56 | 168 | 210 | 336 (252) |
| Tone Group Size = 4 | 28 | 84 | 105 | 168 (126) |

Figure 9:
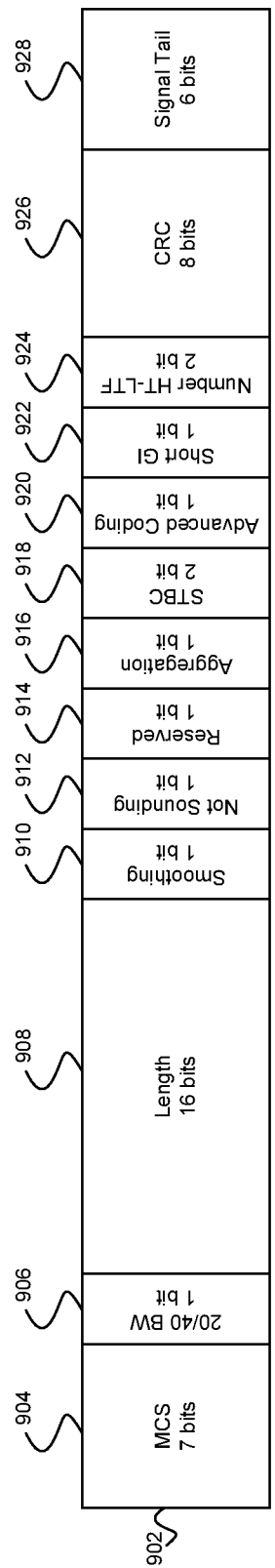
FIG. 9 is a diagram illustrating an exemplary signal header field, which may be utilized in connection with an embodiment of the invention.

FIG. 9 is a diagram illustrating an exemplary signal header field, which may be utilized in connection with an embodiment of the invention. The signal (SIG) header field is a field within a PHY PDU that identifies the PDU and may be utilized to communicate PHY layer configuration information that is utilized by the MIMO transmitter described in FIG. 5. The signal header field may also be utilized by a MIMO receiver 104 to identify a received sounding frame.

Referring to FIG. 9, there is shown a SIG header field 902. The SIG header field 902 may comprise a modulation and coding scheme (MCS) field 904, a 20 MHz/40 MHz bandwidth indication 906, a length field 908, a smoothing indication 910, a not sounding indication 912, a reserved field 914, an aggregation indication 916, an STBC indication 918, an advanced coding indication 920, a short GI indication 922, a number of high throughput long training fields utilized indication 924, a cyclical redundancy check field, 926, and a tail field 928.

The MCS field 904 may comprise 7 bits of binary information. The MCS field 904 may indicate the modulation type and coding rate being utilized in the coding of a PHY PDU (PPDU). The 20 MHz/40 MHz bandwidth field 906 may comprise 1 bit of binary information. The 20 MHz/40 MHz bandwidth field 906 may indicate whether the PPDU is to be transmitted utilizing a 20 MHz RF channel, or a 40 MHz RF channel. The length field 908 may comprise 16 bits of binary information. The length field 908 may indicate the number of octets of binary information that is contained in the physical layer service data unit (PSDU) field within a PPDU. The PSDU may comprise a MAC PDU, for example. The smoothing indication 910 may comprise 1 bit of binary information. The smoothing indication 910 may indicate whether channel estimation may be performed in connection with tone grouping. If smoothing enabled, a channel estimate matrix H may be computed based on a measured portion of the frequency carriers associated with the corresponding RF channel, where estimates for the remaining frequency carriers may be computed based on the measured frequency carriers.

The not sounding indication 912 may comprise 1 bit of binary information. The not sounding indication 912 may indicate whether the PPDU is a sounding frame. The not sounding indication may comprise a binary value 0 to indicate that the PPDU is a sounding frame. The reserved field 914 may comprise 1 bit of binary information. The reserved field 914 may comprise no assigned utilization. The aggregation field 916 may comprise 1 bit of binary information. The aggregation field 916 may indicate whether the PSDU within the PPDU comprises data that is to be aggregated with a data contained in a PSDU in a subsequent PPDU. The STBC indication 918 may comprise 2 bits of binary information. The STBC indication 918 may indicate a difference between the number of spatial streams Nss, and the number of space time streams, Nsts. When Nss=Nsts is indicated, STBC may not be utilized by the MIMO transmitter. The advanced coding field 920 may comprise 1 bit of binary information. The advanced coding field 920 may indicate whether binary convolutional coding (BCC), or low density parity check (LDPC) coding is utilized in the coding of PPDUs at the MIMO transmitter.

The short GI field 488 may comprise 1 bit of binary information. The short GI field 922 may indicate the length, as measured in ns for example, of the guard interval utilized when transmitting symbols in PPDUs transmitted via an RF chain. The number of HT-LTF field 924 may comprise 2 bits of binary information. The number of HT-LTF field 924 may indicate the number of high throughput long training fields contained in a transmitted PPDU. The long training fields may be utilized by a MIMO receiver when computing a channel estimate matrix H. The CRC field 926 may comprise 8 bits of binary information. The CRC field 926 may be computed by a MIMO transmitter, and utilized by a MIMO receiver for detecting and/or correcting errors in a received PPDU. The tail field 928 may comprise 6 bits of binary information. The tail field 928 may be utilized to extend the number of binary bits contained in an SIG field to a desired length, for example to an integer multiple of 8 bits.

Figure 10:
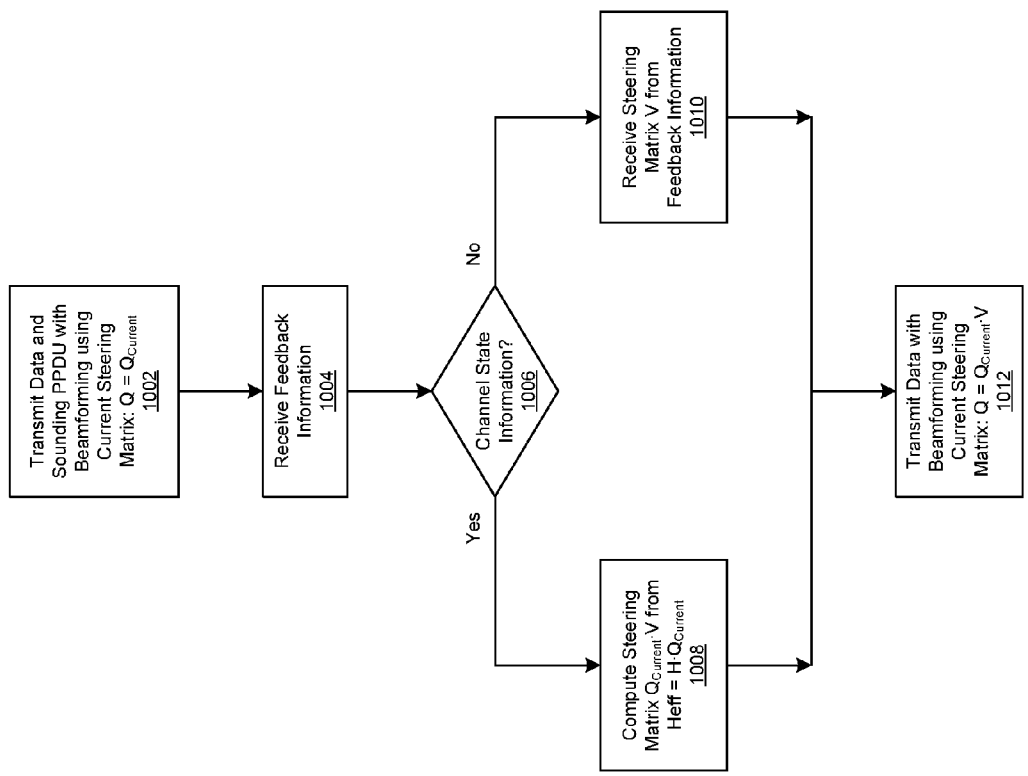
FIG. 10 is a flowchart illustrating exemplary steps for exemplary frame exchange for transmitting data within channel sounding frames, in accordance with an embodiment of the invention.

FIG. 10 is a flowchart illustrating exemplary steps for exemplary frame exchange for transmitting data within channel sounding frames, in accordance with an embodiment of the invention. Referring to FIG. 10, in step 1002, a MIMO transmitter 108 may transmit data within a sounding PPDU utilizing beamforming based on a current steering matrix $Q_{Current}$. In step 1004, the MIMO transmitter 108 may receive feedback information from the MIMO receiver 104. Step 1006 may determine whether the feedback information comprises CSI or a feedback steering matrix. If step 1006 determines that the feedback information comprises CSI, in step 1008, the MIMO transmitter 108 may compute a subsequent steering matrix $Q_{Current} \cdot V$ based on the CSI, as represented by a channel estimate matrix $H_{Eff}$. In step 1012, the MIMO transmitter 108 may transmit subsequent data utilizing beamforming based on the subsequent steering matrix $Q_{Current} \cdot V$.

If step 1006 determines that the feedback information comprises a feedback steering matrix, in step 1010, the MIMO transmitter 108 may receive the feedback steering matrix V from the feedback information. The feedback steering matrix may be utilized by the MIMO transmitter 108 to compute the subsequent steering matrix $Q_{Current} \cdot V$. Step 1012 may follow step 1010.

Figure 11:
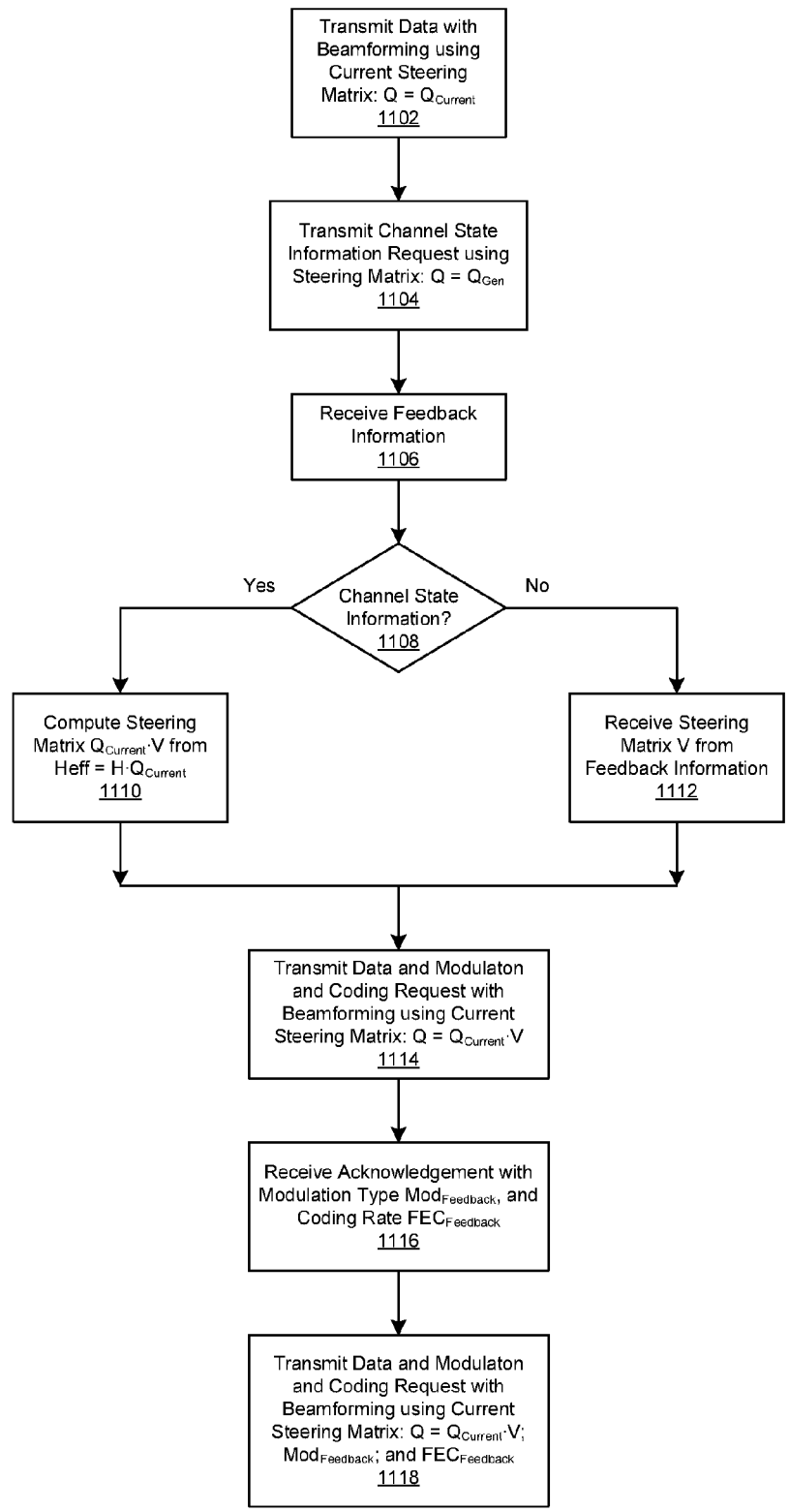
FIG. 11 is a flowchart illustrating exemplary steps for exemplary frame exchange for transmitting channel sounding frames utilizing a non-identity steering matrix, in accordance with an embodiment of the invention.

FIG. 11 is a flowchart illustrating exemplary steps for exemplary frame exchange for transmitting channel sounding frames utilizing a non-identity steering matrix, in accordance with an embodiment of the invention. Referring to FIG. 11, in step 1102, a MIMO transmitter 108 may transmit data frames utilizing beamforming based on a current steering matrix $Q_{Current}$. In step 1104, the MIMO transmitter 108 may transmit a sounding frame utilizing a steering matrix, $Q_{Gen}$, where the matrix $Q_{Gen}$ is not an identity matrix. In step 1106, the MIMO transmitter 108 may receive feedback information from the MIMO receiver 104. Step 1108 may determine whether the feedback information comprises CSI or a feedback steering matrix. If step 1108 determines that the feedback information comprises CSI, in step 1110, the MIMO transmitter 108 may compute a subsequent steering matrix $Q_{Current} \cdot V$ based on the CSI, as represented by a channel estimate matrix $H_{Eff}$. In step 1114, the MIMO transmitter 108 may transmit a frame comprising data an a modulation type and coding rate request. The frame may be transmitted utilizing beamforming based on the subsequent steering matrix $Q_{Current} \cdot V$. In step 1116, the MIMO transmitter 108 may receive an acknowledgement frame from the MIMO receiver 104. The acknowledgement frame may comprise one or more suggested modulation types, $Mod_{Feedback}$, and/or one or more suggested coding rates $FEC_{Feedback}$. In step 1118, the MIMO transmitter 108 may transmit subsequent data frames utilizing a steering matrix, one or more modulation types, and/or one or more coding rates, based on feedback information received during the channel sounding procedure.

If step 1108 determines that the feedback information comprises a feedback steering matrix, in step 1112, the MIMO transmitter 108 may receive the feedback steering matrix V from the feedback information. The feedback steering matrix may be utilized by the MIMO transmitter 108 to compute the subsequent steering matrix $Q_{Current} \cdot V$. Step 1114 may follow step 1112.

Aspects of a system for explicit feedback with sounding packets for wireless local area networks may comprise a beamforming block 518 that may enable generation of a plurality of RF chain signals based on a current steering matrix, where the current steering matrix may be a non-identity matrix. A processor 532 may enable transmission of a request for feedback information via the plurality of RF chain signals. The request may comprise medium access control (MAC) layer protocol data unit (PDU) data and channel sounding information, which may be encapsulated in a physical (PHY) layer PDU. A receiver 284 may enable reception of the feedback information.

The processor 532 may enable computation of a subsequent steering matrix based on the received feedback information. The beamforming block 518 may enable transmission of subsequent MAC layer PDU data based on the subsequent steering matrix. The received feedback information may comprise a channel estimate matrix and/or a feedback steering matrix. The subsequent steering matrix may be the feedback steering matrix. The processor 532 may enable computation of the subsequent steering matrix from the channel estimate matrix by a singular value decomposition (SVD) method. The feedback steering matrix may be represented as an Nss×Nss matrix, where Nss may be a variable representing a number of spatial streams transmitted via the plurality of RF chain signals.

In another aspect of the system the processor 532 may enable transmission of a request for modulation type information and/or coding type information via a subsequent plurality of RF chain signals generated based on the subsequent steering matrix. The request may comprise medium access control (MAC) layer protocol data unit (PDU) data and a modulation and coding request, which may be encapsulated in a physical (PHY) layer PDU. A receiver 284 may enable reception of an acknowledgement PHY PDU comprising the modulation type information and/or coding type information. The processor 532 may enable transmission of subsequent data based on the received acknowledgement PHY PDU.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating information in a wireless communication system comprising:
   generating a plurality of radio frequency (RF) chain signals based on a current steering matrix, wherein the current steering matrix is a non-identity matrix; and
   transmitting a request for feedback information via the plurality of RF chain signals, the request comprising medium access control (MAC) layer protocol data unit (PDU) data and channel sounding information.

2. The method of claim 1, wherein the MAC layer PDU data and the channel sounding information are encapsulated in at least one physical (PHY) layer PDU.

3. The method of claim 1, wherein the MAC layer PDU data and the channel sounding information are encapsulated in differing physical (PHY) layer PDUs.

4. The method of claim 1, further comprising receiving feedback information in response to the request.

5. The method of 4, further comprising computing a subsequent steering matrix based on the received feedback information.

6. The method of claim 5, further comprising transmitting subsequent MAC layer PDU data based on the subsequent steering matrix.

7. The method of claim 4, wherein the received feedback information comprises at least one of: a channel estimate matrix, and a feedback steering matrix when computing the subsequent steering matrix.

8. A wireless device comprising:
a wireless transmitter;
a wireless receiver; and
processing circuitry, the wireless transmitter, wireless receiver, and processing circuitry configured to:
generate a plurality of radio frequency (RF) chain signals based on a current steering matrix, wherein the current steering matrix is a non-identity matrix; and
transmit a request for feedback information via the plurality of RF chain signals, the request comprising medium access control (MAC) layer protocol data unit (PDU) data and channel sounding information.

9. The wireless device of claim 8, wherein the MAC layer PDU data and the channel sounding information are encapsulated in a single physical (PHY) layer PDU.

10. The wireless device of claim 8, wherein the MAC layer PDU data and the channel sounding information are encapsulated in differing physical (PHY) layer PDUs.

11. The wireless device of claim 8, wherein the wireless transmitter, wireless receiver, and processing circuitry are further configured to receive feedback information in response to the request.

12. The wireless device of claim 11, wherein the processing circuitry is further configured to compute a subsequent steering matrix based on the received feedback information.

13. The wireless device of claim 12, wherein the wireless transmitter, wireless receiver, and processing circuitry are further configured to transmit subsequent MAC layer PDU data based on the subsequent steering matrix.

14. The wireless device of claim 11, wherein the received feedback information comprises at least one of: a channel estimate matrix, and a feedback steering matrix when computing the subsequent steering matrix.

15. The wireless device of claim 8, wherein the wireless transmitter and wireless receiver support Wireless Local Area Network (WLAN) communications.

16. A method for communicating information in a wireless communication system comprising:
generating a plurality of radio frequency (RF) chain signals based on a current steering matrix, wherein the current steering matrix is a non-identity matrix; and
transmitting a request for feedback information via the plurality of RF chain signals, the request comprising medium access control (MAC) protocol data unit (PDU) data in a first physical (PHY) layer PDU and channel sounding information in a PHY layer PDU.

17. The method of claim 16, further comprising receiving feedback information in response to the request.

18. The method of 17, further comprising computing a subsequent steering matrix based on the received feedback information.

19. The method of claim 18, further comprising transmitting subsequent MAC layer PDU data based on the subsequent steering matrix.

20. The method of claim 17, wherein the received feedback information comprises at least one of: a channel estimate matrix, and a feedback steering matrix when computing the subsequent steering matrix.

* * * * *